March 31, 1964  L. W. BOOTH  3,126,968
LAWN EDGER
Filed May 24, 1962
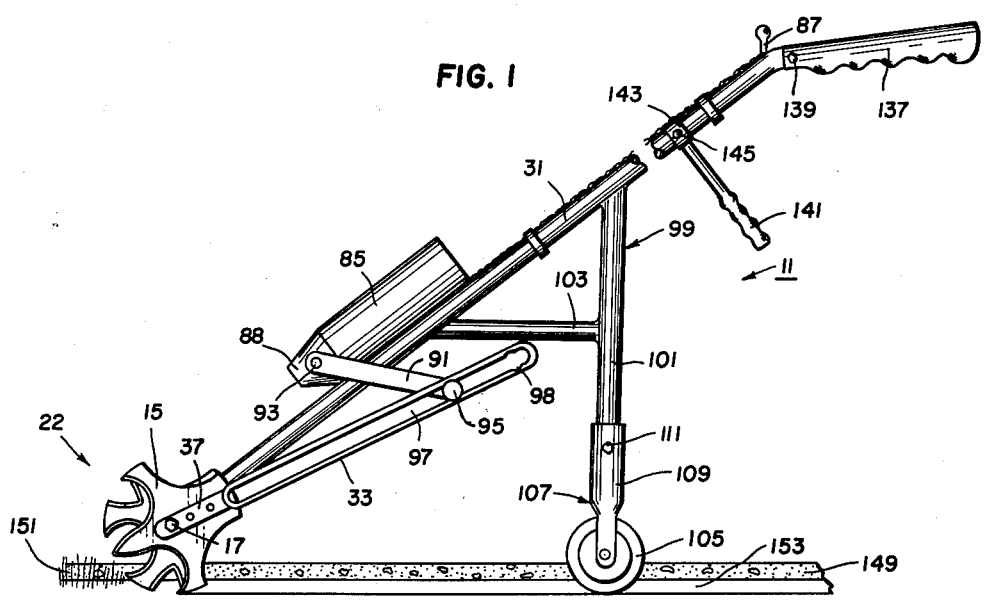
INVENTOR.
LENDON W. BOOTH
BY John R. Walker, III
Attorney

United States Patent Office 3,126,968
Patented Mar. 31, 1964

3,126,968
LAWN EDGER
Lendon W. Booth, 943 Semmes, Memphis, Tenn.
Filed May 24, 1962, Ser. No. 197,366
1 Claim. (Cl. 172—16)

This invention relates to a power driven device for trimming the edges of lawns and the like.

Heretofore there have been various types of power driven devices for edging lawns and the like, with the most common type having a rotatable cutter blade that is driven by an electrical or gasoline motor at a very high r.p.m. When the cutter blade of this type of device hits rocks or other objects, it will propel them through the air and cause a dangerous condition to exist for the operator of the device or for persons nearby. Also, this type of edger occasionally will miss cutting the grass in places, particularly where there is a thick clump of grass or weeds.

The present invention is directed towards overcoming the above and other disadvantages inherent in previous types of power driven edgers.

Thus, one of the objects of the present invention is to provide a device that is safe and in which there is no danger of throwing rocks, etc.

A further object is to provide such a device that is extremely efficient and cuts the grass cleanly.

A further object is to provide such a device that not only cuts the grass along the edge of a lawn, but also digs a trench therealong.

A further object is to provide such a device that is self-sharpening and in which there is no danger of dulling the device on the sidewalk, as frequently occurs with the rotating blade type when it hits the edge of the sidewalk or other hard object.

A further object is to provide such a device that can be used to clip along flower beds and do light tilling therein.

A further object is to provide such a device that is adapted to cut or trench along the edge of a lawn at selected angles.

A further object is to provide such a device that can be used for digging up onions, clumps of unwanted grass and the like.

A further object is to provide such a device that is easy to use and which has a tendency to move in the direction of cutting.

A further object is generally to improve the design and construction of lawn edgers.

The means by which the foregoing and other objects of the present invention are accomplished and the manner of their accomplishment will be readily understood from the following specification upon reference to the accompanying drawings, in which:

FIG. 1 is a side elevational view of the device of the present invention.

FIG. 2 is a top plan view thereof.

FIG. 3 is a fragmentary perspective view of a portion of the adjusting means for the roller.

FIG. 4 is an elevational view of one of the circular cutting plates, per se.

FIG. 5 is a view similar to FIG. 4 of the other circular cutting plate.

FIG. 6 is an enlarged fragmentary sectional view taken as on a vertical plane through the longitudinal center line of the cutting head.

FIG. 7 is a view similar to FIG. 6 of an alternate embodiment and shown on a reduced scale.

Referring now to the drawings in which the various parts are indicated by numerals, device 11 includes, in general, a substantially circular plate 13 and a substantially circular plate 15 of substantially the same diameter as plate 13.

In assembled relationship, plates 13, 15 are held together in flat face-to-face engagement for pivot about a common central axis, as at 17. In other words, the inner face 19 of plate 13 is in flat face-to-face sliding engagement with inner face 21 of plate 15, to establish the cutter head indicated in general as at 22.

The means for holding the plates together in the above described disposition is preferably by a bolt 23 extending through central apertures 25, 27, respectively provided in plates 13, 15, with the bolt being anchored in place by means of a nut 29. Aperture 25 is preferably tapped so that bolt 23 is threadedly engaged therewith.

An elongated handle 31 and an arm 33 are respectively fixedly attached to plates 13, 15 and respectively extend rearwardly therefrom. Handle 31 and arm 33 are preferably removably fixedly attached to the plates or, if desired, the handle and arm may be integrally fixedly attached to the plates, as in the alternate embodiment shown in FIG. 7, without departing from the spirit and scope of the present invention.

In the preferred embodiment shown in FIGS. 1–6, handle 31 and arm 33 are removably attached in the following manner: The forward ends of handle 31 and arm 33 are respectively provided with end portions 35, 37, which in turn are respectively provided with apertures 39, 41 through which bolt 25 extends in the manner best shown in FIG. 6. End portion 35 is preferably split as at 42 from aperture 39 through the end of the end portion so that the end portion acts as a lock washer to lock the nut 29 in place. From the foregoing it will be understood that bolt 23 is fixedly anchored relative to plate 13 and that plate 15 rotates about bolt 23, which serves as an axle. In the alternate embodiment shown in FIG. 7, where there are no end portions, lock washer 43 is provided in place of end portion 35 and a conventional annular washer 44 is provided in place of end portion 37. During prolonged use of device 11, the inner faces 19, 21 will wear slightly and the device may be easily adjusted by loosening nut 29 and turning bolt 23 in tapped aperture 25 so that the plates 13, 15 are drawn together. After bolt 23 is set at the proper place, nut 29 is tightened. This provides a self-sharpening feature of the edger, as will be more fully understood in the hereinafter described operation of the device. End portions 35, 37 are respectively mounted on the outer faces 45, 46 of plates 13, 15, respectively. Screws 47 extend through apertures in end portion 35 and thence into tapped holes in plate 13 to hold the handle 31 in position. In addition, handle 31 is keyed to plate 13 by means of a stepped portion 49 extending into a corresponding stepped notch 51 provided in plate 13 adjacent the edge thereof. Likewise, screws 53 are provided for arm 33 and a stepped portion 55 on arm 33 extends into a stepped notch 57 in plate 15.

Spaced around the forward periphery of plate 13 are provided a plurality of cut-out portions 59, 61, and 63. Cut-out portions 59 and 63 are substantially V-shaped. The cut-out portion 61 is provided between cut-out portions 59 and 63, and the cut-out portion 61 defines an area greater than half the area of a complete circle to provide pairs of inwardly hooked portions 65, 67 of plate 13 on either side of cut-out portion 61, the function of which will be more apparent in the description of the operation of the device to follow later. All of the cut-out portions 59, 61, and 63 are cut through the peripheral edge 69 of plate 13 so that entranceways are provided for the grass or the like to enter the cut-out portions. Also, a pair of cut-out portions 70 are provided in the back of plate 13 primarily to reduce the weight of the plate.

Plate 15 is similarly provided with a plurality of cut-out portions in the plate adjacent the forward periphery thereof. Thus, cut-out portions 71 and 73 are provided in plate 15. Cut-out portions 71, 73 are preferably of substantially the same size and shape as cut-out portion 61 and are located at substantially the same distance from the center of plate 15 as the cut-out portions of plate 13. Thus, hooked portions 75, 77 are respectively provided in plate 15 adjacent cut-out portions 71 and 73. Plate 15 is pointed as at 78 adjacent the forward part thereof between cut-out portions 71, 73. Also, adjacent the rearward part of plate 15 are preferably provided a pair of cut-out portions 79, primarily to reduce the weight of the plate.

Plates 13 and 15 are sharpened to provide sharpened edges 80, 81, 82, 83, and 84 respectively adjacent cut-out portions 59, 61, 63, 71, and 73, so that the sharpened edges of one of the plates 13, 15 cooperate with the sharpened edges of the other plate to edge the lawns, dig a trench, perform light tilling, etc.

Plate 15 is adapted to be pivoted back and forth relative to plate 13 by the following drive mechanism:

A motor 85 is fixedly mounted on handle 31 intermediate the length thereof by suitable means, as by a mounting bracket 86 fixedly attached to the handle and extending to one side thereof and upon which the motor is fixedly attached. Motor 85 is preferably an electric and reversible motor which, in the usual manner, is turned off and on and reversed by means of a three-position switch 87 and which is supplied with electrical power in any suitable manner, as for example, by means of an extension cord, not shown, plugged into the usual electrical outlet. However, it should be understood that motor 85 may be driven by batteries or gasoline powered, or by other means, without departing from the spirit and scope of the present invention. Motor 85 is provided with the usual gear box 88 from which laterally extends the rotatably driven and substantially horizontal shaft 89. A lever 91 is fixedly mounted on shaft 89 adjacent the inner end of the lever and is rotatably driven thereby about a point 93 adjacent the inner end to carry the outer end of the lever in a circular path. Lever 91, adjacent the outer end thereof, is coupled to arm 33 for movement of the outer end longitudinally of the arm to swing the arm back and forth relative to handle 31 and thereby pivot plate 15 back and forth relative to plate 13. Suitable means is provided for the above mentioned coupling, and the preferable means is shown in the drawings, wherein a small wheel 95 is rotatably mounted on lever 91 adjacent the outer end thereof and fits in a slot 97 provided along the length of arm 33. In other words, wheel 95 rollingly engages portions of arm 33 which define slot 97. Adjacent the upper end of slot 97, the slot is enlarged as at 98 to permit entrance of wheel 95 into slot 97 during the initial assembly of the device.

Handle 31 forms part of a frame designated in general as at 99 and which frame additionally includes a substantially vertical member 101 fixedly attached to handle 31 and depending therefrom. In addition, frame 99 includes a brace 103 fixedly interconnecting vertical member 101 and handle 31. A wheel 105 is adjustably mounted on the lower end of vertical member 101 as by means of a wheel mounting member 107 having a pipe-like upper end 109 telescopically receiving the lower end of vertical member 101 and provided with a set screw 111 to hold the wheel mounting member 107 at a selected vertical position relative to vertical member 101.

A roller 113 is adjustably coupled to handle 31 adjacent the lower end thereof, and the roller is disposed laterally relative to plate 13. The means for coupling roller 113 to handle 31 is preferably as follows: Roller 113 is rotatably mounted on an axle 115 which is coupled to a member 117 by means of a plurality of links 119, preferably two in number, and by a plurality of so-called knuckle joints 121 adjustably interconnecting the links 119, axle 115 and member 117 in substantially end-to-end relationship. Member 117 is preferably fixedly attached to bolt 23, as by welding or the like, and forms a lateral extension thereof from plate 13. At the outer end of member 117, one of the knuckle joints is provided, as best seen in FIG. 2. One of the links 119 extends from the last mentioned knuckle joint to another knuckle joint which interconnects the last mentioned link to still another link, which in turn is connected to axle 115 by still another knuckle joint. All of knuckle joints 121 are formed substantially alike, and a detailed showing of one of them is provided in FIG. 3, wherein it will be seen the knuckle joint 121 includes knuckle joint halves 123, 125, each having serrated portions 127 on the inner faces thereof. In addition, the knuckle joint 121 includes a bolt 129 which extends through aligned apertures 131, 133 respectively provided in halves 123, 125 and which bolt is threadedly engaged by a wing nut 135 to clamp the two halves together at a selected angle. In other words, the halves are adjustable about a substantially horizontal axis so that the roller 113 can be positioned towards and away from plate 13. For example, the two links may be pivoted towards each other about the middle knuckle joint 121, shown in FIG. 2, so that the links are adjacent one another, which will pull the roller 113 in close to plate 13. It will be understood, of course, that a corresponding angular adjustment must be made for the other two knuckle joints to keep the roller rotatable about a substantially horizontal axis. If desired, however, the roller 113 may be adjusted so that it rotates about an axis that is at an angle relative to the axis of pivot of plates 13, 15, as for example, if it is desired to tilt the device 11 to one side when cutting the edge of the lawn or trenching at an angle, as will be better understood in the description of the operation of the device to follow.

For holding device 11 during the operation thereof, a handgrip 137 is provided on the upper end of handle 31. Handgrip 137 telescopically and turnably receives the end of handle 31 and is held in a selected fixed position by means of a set screw 139. Also, an additional handgrip 141 is preferably provided on handle 31, and is preferably turnably mounted on the handle by means of a collar 143 through which the handle extends. A set screw 145 provided on collar 143 holds handgrip 141 in a selected fixed position.

In the drawings, the numeral 147 represents a portion of the sidewalk for purposes of illustration, and the numeral 149 represents the edge of the sidewalk, and 151 represents the grass to be cut. In using the device of the present invention, it is preferably moved along the edge 149 of the sidewalk, to the left, as viewed in FIGS. 1 and 2, with the cutter head 22 riding against the edge 149. It will be understood that as the plate 15 is moved back and forth in a manner heretofore described, the device will have a tendency to walk or step along the ground due to the relative motion of the plates. Also, it will be understood that this back and forth motion will cause the sharpened edges of one of the plates 13, 15 to cooperate with the sharpened edges of the other plate to cut the grass and the like. In addition, it will be understood that as the device 11 moves along the edge of the sidewalk, the wheel 105 will travel in the trench 153 formed by the cutting head 22, which will keep the cutting head lined up exactly with the edge of the sidewalk and facilitate cutting.

The advantages of the present invention, as compared with the high-speed rotating cutter blade type of edger, can readily be appreciated when it is considered that the relative speed of the plates 13, 15 is slow, as compared with previous high-speed rotating cutter blades, and will not throw rocks, etc. Also, it can readily be seen that many times when the high-speed rotating cutter blade type of edgers are used, when the cutter blade encounters a large or tough clump of grass or weeds, the blade will be stopped thereby, since it has nothing to cut against but must depend upon the momentum of the blade. Whereas, in device 11, one of the plates 13, 15 cuts against the other to rout out or dig under such clumps. In addition, it will be understood that the plates 13, 15 are self-sharpening against one another and there is little chance for the plates to become dull, as is the case with the high r.p.m. blade which can easily strike the edge of the sidewalk or rocks and the like.

Also, it is apparent that the roller 113 is detachable so that the device may be used as a light tiller in flower beds and the like, and also may be used to dig up unwanted clumps of grass, onions, and the like in the lawn.

Although the invention has been described and illustrated with respect to a preferred embodiment thereof, it is to be understood that it is not to be so limited since changes and modifications may be made therein which are within the full intended scope of this invention as hereinafter claimed.

I claim:

A lawn edger comprising a first plate having a peripheral edge with at least a portion thereof being circular, a second plate in substantially flat face-to-face sliding engagement with said first plate, said second plate having a peripheral edge with at least a portion thereof being circular, means mounting said first and second plates for pivoting movement relative to one another, said first plate being provided with at least one substantially circular cutout portion in the circular peripheral edge portion thereof, said second plate being provided with at least one substantially circular cutout portion in the circular peripheral edge thereof, each of said cutout portions in said first and second plates defining an area greater than half of a circle to provide at least one hooked portion of the plate adjacent each of said circular cutout portions, said first and second plates having sharpened edges adjacent said cutout portions adapted for cutting grass and the like and for simultaneously digging a trench, an elongated handle fixedly attached to said first plate, and motor driven means coupled to said second plate for pivoting said second plate back and forth relative to said first plate; said motor driven means comprising a motor mounted on said handle including a rotatably driven shaft, a lever having an inner end and an outer end, said lever being mounted on said shaft adjacent the inner end of said lever and being rotatably driven thereby about a point adjacent said inner end to carry said outer end of said lever in a circular path, a wheel rotatably mounted on the outer end of said lever, an elongated arm fixedly attached to said second plate, said arm being provided with a slot along the length thereof in which is carried said wheel for movement of said wheel in said slot along the length of said arm to movably couple said lever and said arm whereby movement of said lever in a circular path is effective to move said arm back and forth, and said slot being provided with an enlarged portion adjacent one end thereof for the removal and assembly of said wheel with said arm.

References Cited in the file of this patent

UNITED STATES PATENTS

| | | |
|---|---|---|
| 284,720 | Calvert | Sept. 11, 1883 |
| 1,184,324 | Corrow | May 23, 1916 |
| 1,214,597 | Schneider | Feb. 6, 1917 |
| 1,716,085 | Perkins | June 4, 1929 |
| 2,175,984 | Welsh | Oct. 10, 1939 |
| 2,222,194 | De Bersaques | Nov. 19, 1940 |
| 2,558,459 | Podner | June 26, 1951 |
| 2,629,220 | Grieder | Feb. 24, 1953 |
| 2,673,396 | Beres | Mar. 30, 1954 |
| 2,746,229 | Orr | May 22, 1956 |
| 2,978,041 | Kramer | Apr. 4, 1961 |
| 2,986,224 | Kramaroff | May 30, 1961 |